March 24, 1959     R. L. WRIGHT, JR     2,879,470

TURBINE ECCENTRICITY METER

Filed Oct. 9, 1956

WITNESSES:
Bernard R. Gieguez
George Thompson

INVENTOR
Robert L. Wright, Jr.

BY
Paul E. Friedemann
ATTORNEY

United States Patent Office 2,879,470
Patented Mar. 24, 1959

2,879,470
TURBINE ECCENTRICITY METER

Robert L. Wright, Jr., North Linthicum Heights, Md., assignor to Westinghouse Electric Corporation, East Pittsburgh, Pa., a corporation of Pennsylvania Application October 9, 1956, Serial No. 614,887

11 Claims. (Cl. 324—34)

This invention relates to an eccentricity measuring device and more particularly to an electronic circuit provided with detector coils positioned adjacent a rotating shaft to indicate the amount of eccentricity present.

In the use of some prior rotating machinery an eccentricity indicating device was considered important and necessary. Such a device could be a steam turbine wherein clearances between the rotating spindle and the fixed parts or stator are quite small. Other types of machinery might well use an eccentricity measuring device, but for the present description the use of a steam turbine has been selected.

If a steam turbine has been operating and for some reason is shut down, the upper side of the previously rotating member tends to cool to a lower rate than the lower side, causing the shaft and its associated parts to bow upwardly. This bow is objectionable because it may cause interferences between rotating and fixed parts and further will cause unbalance of the spindle which at high speeds would be dangerous.

As with all rotating machinery, the shaft of the steam turbine is housed in bearings having clearances, in this case on the order of 0.020 of an inch.

Some eccentricity meters provided for steam turbines in the past have been provided with coils placed 180° apart adjacent one end of the turbine shaft. It has been the practice to connect these coils electrically to form two arms of an alternating-current bridge. These two coils, forming two of the arms of the alternating-current bridge, are inductively affected by the eccentricity of rotating shaft positioned therebetween. The amount of bridge unbalance due to the variation of these two coils is then detected and recorded as the eccentricity of the shaft, the remaining arms of the bridge being of fixed value, the bridge theoretically records only the eccentricity of the shaft. However, past experience has shown that as the turbine comes up to speed, the shaft climbs within the bearing within the limits of the 0.020 of an inch clearance previously indicated. This repositioning of the shaft within the bearing also shows up as eccentricity, thus providing an erroneous reading. In order to eliminate erroneous readings, the two normally unaffected arms of the bridge are manually adjusted at periodic intervals to compensate for shaft climb within the bearing. It has also been found that changes in supply voltages to the bridge and detector circuit may also cause erroneous eccentricity readings.

It is therefore an object of this invention to provide an eccentricity measuring system not affected by bearing clearances.

It is another object of this invention to provide an eccentricity measuring system that is fully automatic, eliminating the error due to human intervention.

It is still another object of this invention to provide an eccentricity measuring system in which undesirable variables act to neutralize each other.

It is another object of this invention to provide an eccentricity measuring system that is reliable in operation without being unnecessarily complex.

It is another object of this invention to provide an eccentricity system capable of reliable operation without being affected by external conditions.

Other objects, purposes and characteristic features will be obvious as the description of this invention progresses.

Figure 1:
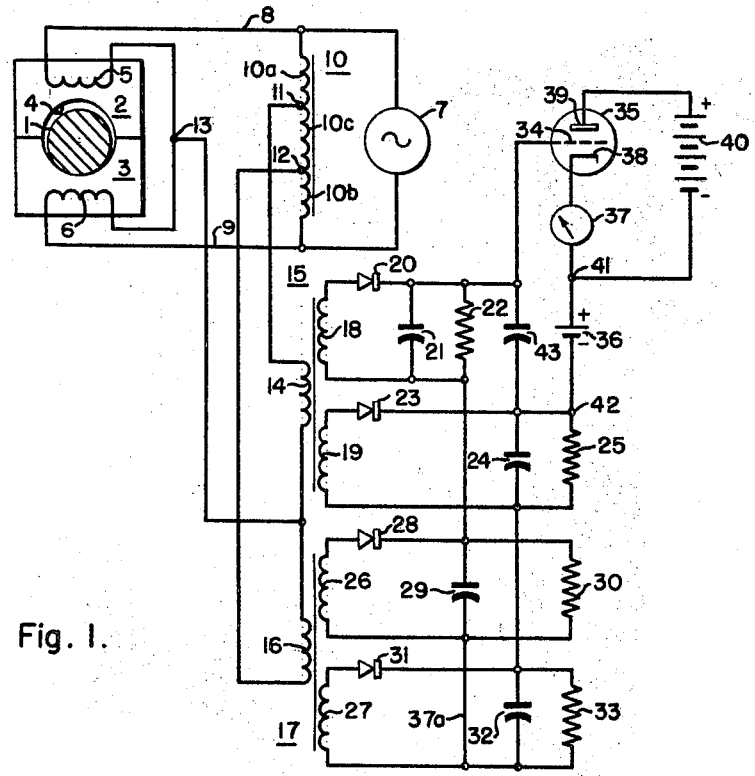
Figure 1 is a schematic view of one embodiment of this invention.

In practicing this invention an eccentricity system comprising an alternating-current bridge having two arms positioned 180° apart adjacent a rotating shaft is provided. A detector circuit for detecting unbalance of the alternating-current bridge comprises two transformers. The primaries of the transformers are connected substantially parallel with one tap of each of the primaries connected to a common point between the two variable arms and the other tap of each primary connected to potential points of different values between the two fixed arms of the bridge. In this way the primaries of each of the transformers have a constant potential difference existing. Each of the transformers are provided with secondaries connected across capacitors capable of storing energy equivalent to the maximum variation in the two variable arms of the Wheatstone bridge and in addition storing the simultaneous instantaneous unbalance of the Wheatstone bridge at any moment due to shaft position and eccentricity. The potential values of the capacitors are then compared and the difference detected. This difference is the eccentricity of the shaft.

In each of the figures of the drawing, similar parts carry like reference characters.

The embodiment of this invention shown in Fig. 1 comprises a rotating shaft 1 housed within typical bearing halves 2 and 3 and having a bearing clearance shown at 4 and exaggerated to better illustrate the situation. The machine associated with the shaft and bearings shown in the drawing has not been disclosed since this would not benefit the description of the invention disclosed herein.

Positioned 180° apart and on opposite sides of the shaft 1 are a pair of coils 5 and 6 which, as disclosed hereinafter, form two variable arms of a Wheatstone bridge. The coils 5 and 6 are connected in series and across a typical alternating-current source 7 by a pair of conductors 8 and 9. Also connected between the conductors 8 and 9 is a coil 10 having a pair of taps 11 and 12 connected at equal potential points from the respective conductors 8 and 9, and thus forming a pair of fixed arms 10a and 10b separated by a detector potential level establishing coil portion 10c.

Connected between the tap 11 on the coil 10 and the tap 13 between the coils 5 and 6 is the primary 14 of the transformer 15. Connected between the tap 12 on the coil 10 and the tap 13 between the coils 5 and 6 is the primary 16 of a second transformer 17. It should be pointed out at this time that the transformers 15 and 17 form the alternating-current bridge detector pickup means with the primaries 14 and 16 respectively being at different potential levels as established by the coil portion 10c.

The transformer 15 is provided with two secondaries 18 and 19. The secondary 18 has connected in series thereacross a rectifier 20 and capacitor 21. Connected in parallel with the capacitor 21 is a bleeder resistor 22 of such high resistance that the capacitor 21 is effectively discharged over a long period of time. This capacitor will be referred to in the remainder of the specification as a long time constant capacitor. The secondary winding 19 is similarly provided with a rectifier 23 and capacitor 24 connected in series and across the winding 19. Here again, the capacitor 24 is provided with a bleeder low resistance 25 capable of discharging the capacitor at a rapid rate so that the capacitor requires recharging approximately every cycle of the alternating-current frequency supply 7. This capacitor in the future will be referred to as the short time constant capacitor.

The transformer 17 is also provided with a pair of secondaries 26 and 27 with the secondary 26 having connected across its terminals in series the rectifier 28 and capacitor 29. The capacitor 29 is provided with a parallel bleeder resistor 30, and as in the case of the capacitor 21, this resistor provides a long discharge period making this capacitor also a long time constant capacitor. Connected in series across the terminals of the secondary winding 27 is a rectifier 31 and capacitor 32. The capacitor 32 in this case also is provided with a parallel bleeder resistor 33 of low enough resistance to provide rapid discharge of the capacitor 32 making this capacitor also a short time constant capacitor similar to the capacitor 24 previously described. It is also desirable for this capacitor to be discharged sufficiently fast that it will need recharging each cycle of the alternating-current source supply.

The two long time constant capacitors 21 and 29 are connected in series and to the grid 34 of a vacuum tube 35. The two short time constant capacitors 24 and 32 are also connected in series and connected through a bias battery 36 and recording meter 37 to the cathode 38 of the tube 35. The remaining end of the series connection of the capacitors 21, 29 and 24, 32 is connected to the remaining end of the capacitor series 24, 32 by a jumper 37a. This forms a complete grid-to-cathode circuit including the bias battery 36. The anode 39 of the tube 35 is then connected to the positive terminal of a source 40 of direct current with the negative terminal of the direct-current source being connected to a point 41 between the indicating meter 37 and the bias battery 36. The capacitors 21 and 29 are connected in such a manner as to have their potentials additive. The capacitors 24 and 32 are also connected in such a manner as to have their potentials additive. However, the capacitors 24 and 32 are differentially connected to the capacitors 21 and 29, therefore providing grid control equal to the differential value of the two pairs of capacitors. That is, the grid-to-cathode potential, neglecting the bias battery, would be equal to the potentials of the capacitors 21 and 29 additive less the potentials of the capacitors 24 and 32 additive, this difference being proportional to the eccentricity of the shaft 1 in the bearing halves 2 and 3. Connected between the grid 34 of the tube 35 and the point 42 between the capacitor 24 and the bias battery 36 is a filter and clamping capacitor 43. This capacitor serves to stabilize the system and its effect on the differential values of the previously recited capacitors is negligible.

Figure 2:
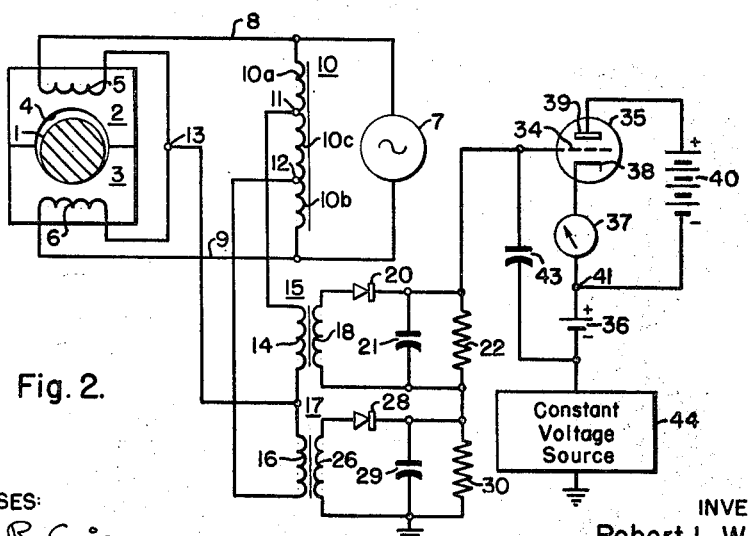
Fig. 2 is a schematic view showing another embodiment of this invention.

The embodiment shown in Fig. 2 is identical with the embodiment shown in Fig. 1, with the exception that each of the second secondary windings of the transformers 15 and 17 and their associated component parts have been eliminated and replaced with a constant voltage source 44. The constant voltage source 44 then represents the potential established by the capacitors 24 and 32 in the first species. Since the added potentials of the capacitors 24 and 32 are equal to a value representing the total coil-to-coil air gap and although the potential of each capacitor may change due to shaft 1 climbing within the bearing halves 2 and 3, the total potential is constant. This is due to the fact that as one capacitor increases its potential level the second one decreases its potential. The difference in operation between the species of Fig. 1 and Fig. 2 is that the constant voltage source of Fig. 2 cannot correct for errors due to external causes. It can be seen that the constant voltage source replacing the capacitors 24 and 32 of Fig. 1 could not compensate for changes in the Wheatstone bridge circuit due to external causes as can the capacitors 24 and 32 which are recharged every cycle of the alternating-current source, thus adjusting for any changes in this Wheatstone bridge circuit every cycle of the alternating source 7.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A shaft eccentricity determining system comprising a first and second coil positioned on opposite sides of a shaft and connected in series across a source of power, a third, fourth and fifth coil connected in series across the source of power in parallel with the first and second coils, a first transformer having a primary and two secondaries, said first transformer primary having one terminal connected to a point between said first and second coils and another terminal to a point between said third and fourth coils, a second transformer having a primary and two secondaries, said second transformer primary having one terminal connected to said point between the first and second coil and another terminal connected to a point between said fourth and fifth coils, a first long time constant capacitor, a first rectifier connected in series with said first long time constant capacitor and both connected across one of said first transformer's two secondary windings, a first resistor connected across said first capacitor, a second long time constant capacitor, a rectifier connected in series with said second long time constant capacitor and both connected across one of said second transformer's two secondaries, a second resistor connected across said second long time constant capacitor, a first short time constant capacitor, a third rectifier connected in series with said first short time constant capacitor and both connected across the other of said two secondaries of said first transformer, a third resistor connected across said first short time constant capacitor, a second short time constant capacitor, a fourth rectifier connected in series with said second short time constant capacitor and both connected across the other of said two secondaries of said second transformer, a fourth resistor connected across said second short time constant capacitor, an electron tube having a cathode, a grid and an anode, said long and short time constant capacitors being connected in series with the short time constant capacitors opposing said long time constant capacitors, an eccentricity calibrated meter connected to said cathode, a bias means, said meter, said bias means and said capacitors being connected in series between said cathode and grid, and high voltage means having one side connected to a point between said bias means and said meter and the side connected to said anode.

2. A shaft eccentricity determining system comprising an alternating-current supplied Wheatstone bridge having a pair of variable legs, said variable legs being positioned in close proximity to a shaft and in opposing position to each other, a first capacitor means connected to said bridge for detecting and storing a first potential established by the maximum distance between the shaft and said pair of variable legs, a second capacitor means connected to said bridge being rechargeable every cycle of said alternating current for establishing a second potential equal to the instantaneous total distance between said variable legs and said shaft, and means for detecting the difference between said first and second potentials.

3. A shaft eccentricity detecting device comprising a pair of coils positioned adjacent to said shaft and in opposing positions to each other, source means for energizing said coils and detecting means connected to said coils for differentially comparing the maximum difference in inductance of said coils with the simultaneous instantaneous inductive condition of said coils.

4. A shaft eccentricity detecting device comprising a plurality of coils positioned adjacent to said shaft and in opposing positions with respect to each other, source means for energizing said coils and detecting means connected to said coils for differentially comparing the maximum difference in inductance of said coils with the simultaneous instantaneous inductive condition of said coils, said detecting means comprising a plurality of capacitors having charge levels proportional to the maximum and simultaneous instantaneous inductive conditions of said coils.

5. A member eccentricity determining system comprising an alternating-current supplied Wheatstone bridge having a plurality of variable arms, said variable arms being positioned in close proximity to said member and in opposing positions with respect to each other, and detecting means connected to said bridge for differentially combining the maximum potential difference of said arms with the simultaneous instantaneous potential condition of said arms.

6. A member eccentricity determining system comprising an alternating-current supplied Wheatstone bridge having a pair of variable arms, said variable arms being positioned in close proximity to said member and in opposing positions to each other, and detecting means connected to said bridge for differentially combining the maximum combined potentials of said arms with the simultaneous instantaneous combined potentials of said arms, said detecting means comprising a plurality of capacitors having energy levels proportional to the maximum and simultaneous instantaneous potential conditions of said arms.

7. An eccentricity determining system comprising an alternating current supplied Wheatstone bridge having a pair of variable arms being positioned in close proximity with an eccentric member and on opposite sides thereof, and detecting means connected to said bridge for differentially combining the minimum reactance level of the arms with the simultaneous instantaneous reactance level of said arms.

8. An eccentricity determining system comprising an alternating current supplied Wheatstone bridge having a pair of variable arms being positioned in close proximity with an eccentric member and on opposite sides thereof, and detecting means for differentially comparing the minimum reactance level of the arms with the simultaneous instantaneous reactance level of said arms, said detecting means comprising two pairs of capacitors, one pair having long time constant characteristics for responding and storing energy during the time of said minimum reactance level, the other pair having short time constant characteristics for storing energy for very short periods in response to the said simultaneous instantaneous reactance level of said arms, and means for indicating the differential potential level of said one pair of capacitors with respect to said other pair of capacitors.

9. An eccentricity determining system comprising an alternating current supplied Wheatstone bridge having a pair of variable arms being positioned in close proximity with an eccentric member and on opposite sides thereof, and detecting means for differentially combining the minimum reactance level of the arms with the simultaneous instantaneous reactance level of said arms, said detecting means connected to said bridge for comprising a pair of long time constant capacitors for storing energy during the time of said minimum reactance level of said arms, a constant voltage source, and indicator means for indicating the differential energy level of said pair of long time constant capacitors with respect to said constant voltage source.

10. An eccentricity determining system comprising an alternating current supplied Wheatstone bridge having variable arms positioned in close proximity with an eccentric member and on opposite sides thereof, and detecting means for differentially comparing the minimum reactance level of the arms with the simultaneous instantaneous reactance level of said arms, said detecting means comprising a pair of long time constant capacitors, a pair of rectifiers, said pair of long time constant capacitors being connected to said arms through said pair of rectifiers for storing energy during the time of said minimum reactance level of said arms, a constant voltage source, and indication means connected to indicate the differential energy level of said pair of long time constant capacitors with respect to said constant voltage source.

11. An eccentricity determining system comprising an alternating current supplied Wheatstone bridge having a pair of variable arms positioned in close proximity with an eccentric member and on opposite sides thereof, and detecting means for differentially comparing the minimum reactance level of the arms with the simultaneous instantaneous reactance level of said arms, said detecting means comprising a pair of long time constant capacitors, a pair of rectifiers, said pair of long time constant capacitors being connected to said arms through said pair of rectifiers for storing energy during the time of said minimum reactance level of said arms, a constant voltage source, and indication means connected to indicate the differential potential level of said pair of long time constant capacitors with respect to said constant voltage source, said indication means comprising an electron tube having first, second and third elements, a visual indicator, said pair of capacitors, said constant voltage source and said visual indicator being connected between said first and second elements with said visual indicator also being in a circuit between said second and third elements.

References Cited in the file of this patent

UNITED STATES PATENTS

| | | |
|---|---|---|
| 2,340,609 | Mestas | Feb. 1, 1944 |
| 2,434,547 | Browne | Jan. 13, 1948 |